(12) United States Patent
Lindell (10) Patent No.: US 9,960,919 B2
(45) Date of Patent: May 1, 2018

(54) METHOD FOR PROVIDING SECURITY USING SECURE COMPUTATION (71) Applicant: BAR-ILAN UNIVERSITY, Ramat Gan (IL)

(72) Inventor: Yehuda Lindell, Givat Shmuel (IL)

(73) Assignee: BAR-ILAN UNIVERSITY, Ramat Gan (IL)

( * ) Notice: Subject to any disclaimer, the term of this patent is extended or adjusted under 35 U.S.C. 154(b) by 0 days. days.

(21) Appl. No.: 14/652,454

(22) PCT Filed: Jan. 8, 2014

(86) PCT No.: PCT/IB2014/058121
§ 371 (c)(1),
(2) Date: Jun. 16, 2015

(87) PCT Pub. No.: WO2014/108835
PCT Pub. Date: Jul. 17, 2014

(65) Prior Publication Data
US 2015/0349958 A1  Dec. 3, 2015

Related U.S. Application Data

(60) Provisional application No. 61/749,943, filed on Jan. 8, 2013.

(51) Int. Cl.
*H04L 29/00* (2006.01)
*H04L 9/32* (2006.01)
(Continued)

(52) U.S. Cl.
CPC ............ *H04L 9/3226* (2013.01); *G06F 21/31* (2013.01); *G06F 21/62* (2013.01); *H04L 9/085* (2013.01);
(Continued)

(58) Field of Classification Search
CPC ... H04L 9/08; H04L 9/32; H04L 63/04; H04L 63/06; H04L 63/08
See application file for complete search history.

(56) References Cited

U.S. PATENT DOCUMENTS 5,991,414 A * 11/1999 Garay .................... H04L 9/302
380/30
8,705,730 B2 * 4/2014 Lieber ................... H04L 9/0894
380/28
(Continued)

FOREIGN PATENT DOCUMENTS

WO    WO2008034090    3/2008

OTHER PUBLICATIONS

Cramer, Ronald, Ivan Damgård, and Jesper B. Nielsen. "Multiparty computation from threshold homomorphic encryption." International Conference on the Theory and Applications of Cryptographic Techniques. Springer, Berlin, Heidelberg, 2001.*
(Continued)

*Primary Examiner* — Madhuri Herzog
(74) *Attorney, Agent, or Firm* — Daniel J. Swirsky; AlphaPatent Associates Ltd.

(57) ABSTRACT

A method of securing data, the method comprising: dividing a secret key into a plurality of secret key shares; storing each of the plurality of secret key shares in a different server of a plurality of servers so that none of the servers has access to the secret key and to the secret key share stored in another of the servers; using a server of the plurality of servers to execute a secure computation protocol to determine a value of a function responsive to all of the plurality of secret key shares without providing any of the plurality of servers with access to the secret key and to the secret key share stored in another of the servers; and using the calculated value of the function to secure the data.

6 Claims, 3 Drawing Sheets

(51) Int. Cl.
*H04L 29/06* (2006.01)
*G06F 21/62* (2013.01)
*G06F 21/31* (2013.01)
*H04L 9/08* (2006.01)

(52) U.S. Cl.
CPC .......... *H04L 9/3228* (2013.01); *H04L 9/3231* (2013.01); *H04L 9/3271* (2013.01); *H04L 63/06* (2013.01); *H04L 63/0838* (2013.01); *H04L 63/0861* (2013.01); *G06F 2221/2103* (2013.01); *H04L 2209/46* (2013.01)

(56) References Cited

U.S. PATENT DOCUMENTS

| | | | | |
|---|---|---|---|---|
| 8,917,872 | B2* | 12/2014 | Li | 380/277 |
| 2001/0044900 | A1* | 11/2001 | Uchida | G06F 21/32 |
| | | | | 713/186 |
| 2002/0067832 | A1* | 6/2002 | Jablon | H04L 9/0844 |
| | | | | 380/277 |
| 2004/0221163 | A1 | 11/2004 | Jorgensen et al. | |
| 2006/0229988 | A1* | 10/2006 | Oshima | G06Q 20/341 |
| | | | | 705/50 |
| 2007/0130474 | A1* | 6/2007 | Shatford | H04L 9/12 |
| | | | | 713/184 |
| 2009/0119504 | A1 | 5/2009 | Van Os et al. | |
| 2010/0131755 | A1 | 5/2010 | Zhu et al. | |
| 2010/0202609 | A1* | 8/2010 | Sandhu | H04L 9/0825 |
| | | | | 380/44 |
| 2012/0060033 | A1 | 3/2012 | Giuliani et al. | |

OTHER PUBLICATIONS

Lindell, Yehuda, and Benny Pinkas. "Secure multiparty computation for privacy-preserving data mining." Journal of Privacy and Confidentiality 1.1 (2009): 5.*

Ishai, et al., "On Achieving the Best of both worlds in secure multiparty computation" International Association for Cryptologic Research, Jan. 20, 2010, vol. 20100122:035546, pp. 1-23.

* cited by examiner

METHOD FOR PROVIDING SECURITY USING SECURE COMPUTATION

CROSS-REFERENCE TO RELATED APPLICATIONS

The present application is a U.S. National Phase Application under 35 U.S.C. 371 of International Application No. PCT/IB2014/058121, which has an international filing date of Jan. 8, 2014, and which claims the benefit under 35 U.S.C. 119(e) of U.S. Provisional Application 61/749,943 filed on 8 Jan. 2013, the disclosure of which is incorporated herein by reference.

FIELD

Embodiments of the invention relate to securing information.

BACKGROUND

Modern communication networks enable a user direct, "digital" use of a myriad of business and entertainment services at physical arm's length. The services enable such everyday tasks as checking bank accounts, making investments, purchasing goods, video conferencing, playing games, and participating in virtual worlds without a necessity of being present at any particular physical venue of the services.

To be commercially acceptable and viable, many of the services require authentication of their users to protect the users and/or the services from inappropriate use that may damage the users and/or the services. For example, online banking would not be commercially functional without stringent authentication procedures, and cloud based services, such as cloud data storage and computing, would not be useable without authentication procedures for safeguarding data integrity and confidentiality. Since physical presence is generally not a requirement, nor generally available or advisable for access to the services, once conventional face to face authentication of a user, has been replaced by various arms length, computer mediated procedures for authenticating a user's identity.

Typically, an authentication procedure requires presentation of a password. And almost everyone is familiar with the nuisance of remembering and using one of generally many assigned or personally generated passwords to authenticate himself or herself for access to such everyday services and devices, such as an automatic teller machine (ATM), or even his or her own laptop or tablet. Such passwords, referred to as static passwords, are not only difficult to manage and remember but are also relatively easily stolen or disclosed.

Many recent authentication procedures have adopted use of one-time passwords (OTPs) for authenticating a user to a service to which the user is subscribed. An OTP is a temporary password that is intended to be used only once to authenticate access of the user to the service, and once used, to be replaced by another OTP. To provide the user with repeated access to the service the user may be issued a device, conventionally referred to as a "token" or "OTP token, that generates and displays a sequence of OTPs for the user, each of which the user may present to the service for a one time authentication and access to the service. The token comprises a unique, secret digital key, hereinafter also referred to as an encryption key, or secret key, and uses an encryption algorithm to compute each OTP in the sequence as a function of the secret key, and generally a time at which the OTP is computed or a count of a number of times the user has accessed the service. Time may be provided by a clock comprised in the token and a count may be registered by a counter in the token.

For a token that computes OTPs as a function of the secret key and time or a count, the clock or counter in the token is synchronized with a clock or counter respectively in an authentication server that operates to authenticate requests for access to the service. The authentication server comprises or has access to an authentication database comprising a list of users subscribed to the service and the secret keys associated with their respective tokens. Hereinafter, a secret key associated with a user's OTP token may also be referred to as the user's secret key or secret OTP key. When a user desires access to the service, the user contacts the service using any suitable communication device such as for example a computer, laptop, tablet, or smartphone to submit a request for access to the service. To be authenticated and have the request granted, the user uses the communication device to submit an OTP provided by the user's OTP token, and usually a user ID or PIN, to the service. Upon receipt of the user's ID and OTP, the authentication server locates the user's secret key in the authentication database and generates a test OTP using the located secret key, the encryption algorithm used by the user's token to generate OTPs, and a time or count at which presumably the user token generated the submitted OTP. If the submitted OTP and the test OTP are the same, the user is authenticated and permitted access to the service.

Whereas authentication systems using OTPs provide convenient and improved security relative to authentication systems based on static passwords, the systems may be breached and the security they provide compromised if the authentication database is hacked and the list of users and associated secret keys stolen.

SUMMARY

An aspect of an embodiment of the invention relates to providing an OTP authentication system, hereinafter also referred to as an OTP authenticator, comprising a plurality of authentication servers for authenticating user access to a service. Secret OTP keys of tokens issued to users subscribed to the service are split into a plurality of secret shares, and each authentication server has access to a different secret portion, hereinafter a secret share, of a user's secret OTP key. The authentication servers are configured to cooperate using a secure computation protocol to determine, responsive to their respective secret shares, whether an OTP submitted by a user with a request for access to the service was computed using the user's secret key. Cooperation of the computers is performed without any of the servers acquiring the secret share of another of the servers and/or a copy of the secret key. Optionally, the authentication servers execute the protocol to generate a test OTP responsive to the secret shares and compare the test OTP to the submitted OTP to determine if the submitted OTP was computed using the user's secret key.

A share of a secret key comprises data that may be used to determine the secret key but cannot be used to determine the secret key without data comprised in another share of the secret key. A secure computation protocol is a protocol in accordance with which a plurality of N entities having data $x_n$, $1 \leq n \leq N$, respectively, may cooperate to determine a value for a function $f(x_1, x_2 \ldots x_N)$ and provide at least one of the entities with the value, without any of the entities acquiring a value $x_n$ belonging to another of the entities.

In an embodiment of the invention a user's token calculates an OTP using an encryption algorithm, optionally a cryptographic hash, having as an input the token's secret key and time or a count. The secure computation protocol is formulated so that for a same secret key and same input of time or count, the secure computation protocol and encryption algorithm calculate a same OTP.

In an embodiment of the invention, a secret key comprises a feature vector that represents a biometric trait of a user and the secret shares are shares of the feature vector.

In an embodiment of the invention, OTPs are used for transaction signing and are generated by a token that executes an encryption algorithm responsive to a count, a secret key, and a function of transaction information, and/or a challenge generated by an authentication server that includes transaction information.

Whereas the above discussion describes using shares of a secret key and a secure computation protocol to authenticate an OTP, embodiments of the invention are not limited to authentication of an OTP. Shares of a secret key and a secure computation protocol may be used to authenticate static keys or to encrypt data. In an embodiment of the invention, shares of a secret key and a secure computation protocol are used in a challenge-response protocol to authenticate a party for participation in an activity. Optionally, the activity comprises establishing a virtual private network (VPN) communication channel and the party is a point of presence (POP) communication device.

In addition it is noted that as used herein, a server may be any combination of software and/or hardware that is suitable for executing a computation that may be performed by an embodiment of the invention in carrying out an application for which it is intended.

There is therefore provided in accordance with an embodiment of the invention, a method of securing data, the method comprising: dividing a secret key into a plurality of secret key shares; storing each of the plurality of secret key shares in a different server of a plurality of servers so that none of the servers has access to the secret key and to the secret key share stored in another of the servers; using a server of the plurality of servers to execute a secure computation protocol to determine a value of a function responsive to all of the plurality of secret key shares without providing any of the plurality of servers with access to the secret key and to the secret key share stored in another of the servers; and using the calculated value of the function to secure the data. Optionally, the calculated value comprises an encryption of the data.

In an embodiment of the invention, using the calculated value to secure the data comprises using the calculated value to determine whether or not a password received from a sender by at least one of the servers was generated using the secret key and enabling access by the sender to the data if and only if it was determined that the password was generated using the secret key. Optionally, the password comprises a onetime password (OTP) generated using the secret key. Additionally or alternatively, the secret key may comprise a static password generated using the secret key.

In an embodiment of the invention, the secret key comprises a key used in a Kerberos protocol and the calculated value comprises an encryption of a ticket granting ticket (TGT) used by the protocol. The secret key may comprise a key used in a Kerberos protocol and the calculated value an encryption of a service ticket (ST) used by the protocol.

In an embodiment of the invention, the secret key comprises a feature vector representing a biometric feature. In an embodiment of the invention, the data comprises a feature vector representing a biometric feature.

There is further provided in accordance with an embodiment of the invention, a method of authenticating a party for participation in an activity, the method comprising: dividing a first secret key into a plurality of secret key shares; storing each of the plurality of secret key shares in a different server so that none of the servers has access to the secret key share stored in another of the servers; transmitting a challenge to the party and requesting that the party encrypt the challenge using a second key; receiving the encryption; using a server of the plurality of servers to execute a secure computation protocol to determine a value of a function responsive to all of the plurality of secret key shares without providing any of the plurality of servers with access to the first secret key and to the secret key share stored in another of the servers; using the calculated value and the encryption to determine whether the second key is equal to the first key; and enabling the party to participate in the activity if and only if it was determined that the first and second keys are equal. Optionally, the activity comprises establishing a virtual private network communication channel. Additionally or alternatively, the party comprises a communication device.

There is further provided in accordance with an embodiment of the invention, apparatus for authenticating access to data, the apparatus comprising: a plurality of servers each having a different share of a same secret key; a password generated responsive to the secret key which if presented to a server of the plurality of servers allows access to the data; and an instruction set executable by a server of the plurality of servers to execute a secure computation protocol to determine responsive to all of the shares if a password received by a server was generated responsive to the secret key. Optionally, the password comprises a onetime password. Additionally or alternatively, the password comprises a static password.

In the discussion, unless otherwise stated, adverbs such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1:
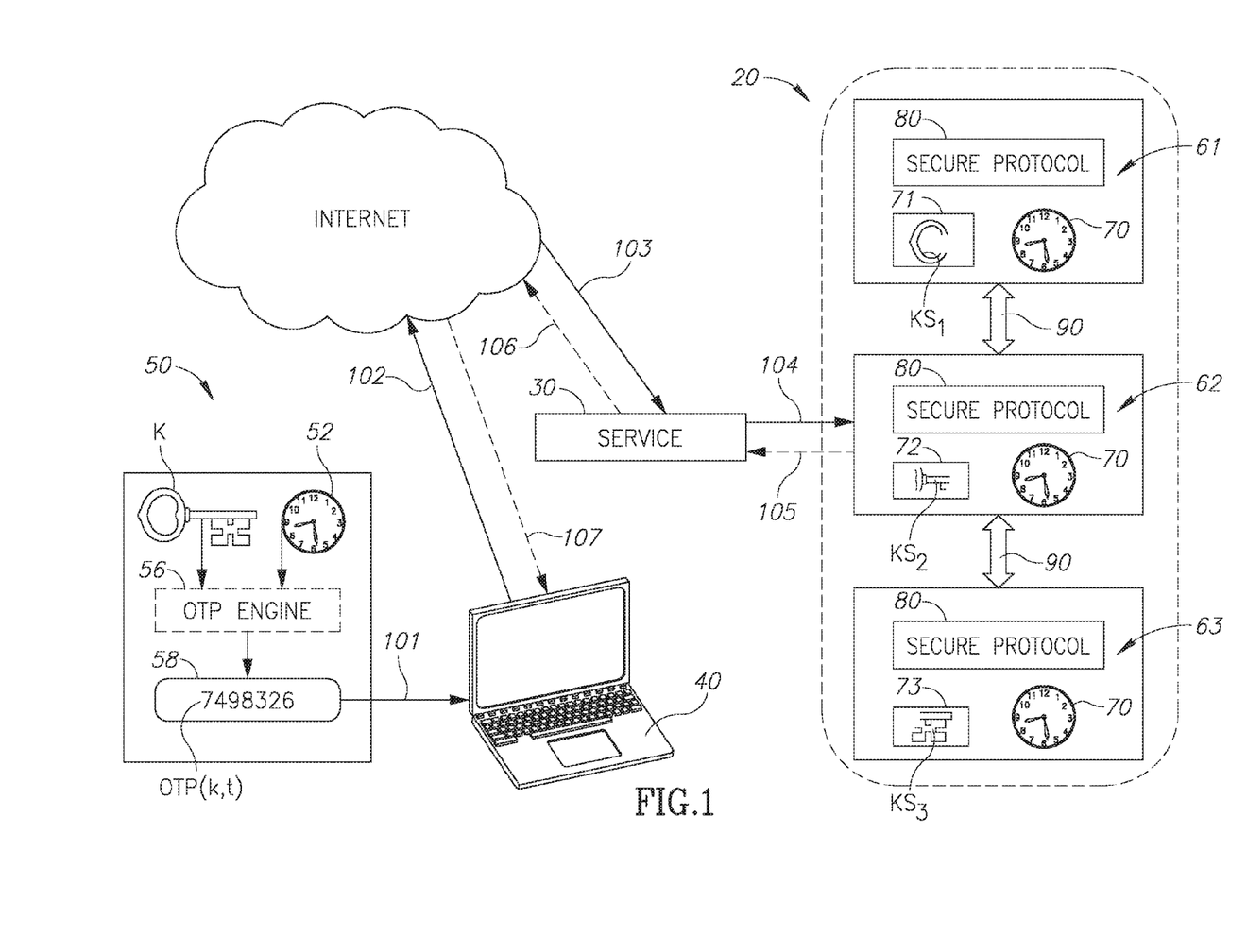
FIG. 1 schematically shows an OTP authenticator authenticating a user for access to a service using a secure computation protocol, in accordance with an embodiment of the invention.

FIG. 1 schematically shows an OTP authenticator 20 authenticating a request for access to a service 30, in accordance with an embodiment of the invention. By way of example, the request is shown being submitted to service 30 by a user (not shown) that has connected to the service optionally via the Internet using a laptop computer 40. Service 30 may be any of various services, such as by way of example an online banking service, a cloud computing or storage service, or a service that provides secure communication channels, that may require authentication for access to the service. And whereas FIG. 1 shows service 30 being accessed via the Internet using a laptop, practice of the invention is not limited to communication via the Internet and or using a laptop. Any communication device, such as a smartphone, a tablet, and a desktop computer, and any wire and wireless communication channel that may support any of various electromagnetic and electrical communication signals may be used to be authenticated for access to a service.

OTP authenticator 20 comprises an OTP token 50 for each user subscribed to service 30 that generates OTPs for submission to service 30 for use in authenticating requests by the user for access to the service and a plurality of optionally three authentication servers 61, 62, and 63 for authenticating OTPs submitted by users for access to service 30. Authentication servers 61, 62, and 63 are configured to communicate with each other over communication channels schematically represented by double arrowhead block arrows 90. The communication channels may be wireless or wire channels that support electromagnetic signals such as RF or optical signals or electrical signals, and the authentication servers may be implemented in hardware and/or software and be located substantially in a same facility or be configured as distributed systems.

Whereas OTP authenticator 20 is shown having three authentication servers, the number shown is for convenience of presentation, and practice of the invention is not limited to three authentication servers. An authenticator in accordance with an embodiment of the invention may have any number of two or more authentication servers. Operation of authentication servers 61, 62 and 63 is discussed below.

OTP token 50 is assumed by way of example to generate OTPs responsive to time, and comprises a clock 52 that provides the time, a unique secret key, that is schematically represented by a key "K", and an OTP engine 56. OTP engine 56 uses an encryption algorithm to generate a sequence of OTPs in which each OTP in the sequence is a function of secret key K and a time provided by clock 52 at which the OTP is generated. OTP token 50 exhibits OTPs that it generates on a display screen 58 so that the user can transmit a copy of an OTP shown on the display at a time at which the user submits a request for authentication to access service 30.

OTP token 50 may be configured to generate OTPs using any of various encryption algorithms, such as by way of example, a triple data encryption algorithm (3DES), an advance encryption standard (AES) algorithm, or hash based message authentication code (HMAC), or any combination of more than one encryption algorithm. For convenience of presentation it is assumed that OTP engine 56 uses an HMAC algorithm to generate OTPs and an OTP generated at a time t may be represented by OTP(K, t) and its generation by OTP engine 56 using HMAC represented by an expression OTP(K,t)=HMAC(K,t). A possible exemplary OTP(K,t) generated by OTP engine 56 at time t at which the user is using laptop 40 to access service 30 is shown in display screen 58.

Each authentication server 61, 62, and 63 comprises a clock 70, and comprises, or has access to, a database 71, 72, and 73 respectively. Clock 70 in each authentication server 61, 62, and 63 is synchronized with clock 52 in each user OTP token 50, and secret key K comprised in the OTP token is divided into optionally three secret shares $KS_1$, $KS_2$, $KS_3$, which are stored respectively in databases 71, 72, and 73. Each authentication server 61, 62, and 63 may comprise a computer executable instruction set for executing a secure computation protocol 80 in cooperation with others of the authentication servers to authenticate an OTP submitted to service 30, as discussed below.

In requesting access to service 30, the user of laptop 40 and OTP token 50 optionally enters OTP(K,t) shown on display screen 58 of the OTP token into the laptop and transmits OTP(K,t), optionally together with a user ID, to service 30 via the Internet. Entering OTP(K, t) into laptop 40 is schematically indicated by a solid arrow 101 and transmission of OTP(K,t) and the user ID to service 30 via the Internet is schematically represented by solid arrows 102 and 103.

Upon receiving OTP(K,t) and the user ID, service 30 optionally forwards the OTP(K,t) and user ID to OTP authenticator 20, which distributes the ID of the user optionally to each of authentication servers 61, 62, and 63. Upon receiving the user ID, authentication servers 61, 62, and 63 locate in their respective databases 71, 72, and 73 the secret shares $KS_1$, $KS_2$, $KS_3$ that are associated with the user's secret key K. Authentication servers 61, 62, and 63 communicate with each other over communication channels 90 to cooperate and exchange information in executing secure computation protocol 80 using secret shares $KS_1$, $KS_2$, $KS_3$ and time t to determine whether or not OTP(K,t) is authentic. Using secure computation protocol 80, authentication is performed without any of authentication servers 61, 62, and 63 acquiring secret key K or a secret share $KS_1$, $KS_2$, $KS_3$ belonging to another of the authentication servers.

In an embodiment of the invention, secure computation protocol 80 may comprise an encryption of a Boolean circuit representation of the algorithm HMAC(K,t) that OTP engine 56 uses to generate OTPs. In an embodiment of the invention secure computation protocol 80 enables authentication servers 61, 62 and 63 to compute OTPs responsive to secret shares $KS_1$, $KS_2$, $KS_3$ and time t, which for a same time t are the same as OTPs computed by the OTP engine, without any of the authentication servers acquiring secret key K or a secret share $KS_1$, $KS_2$, $KS_3$ belonging to another of the authentication servers. Optionally, secure computation protocol 80 implements encryption of the Boolean circuit using garbled circuits. In an embodiment of the invention, secure computation protocol 80 implements the secure computation of the Boolean circuit using gate by gate oblivious computation.

Let an OTP computed by OTP authenticator 20 for a given time t using secure computation protocol 80 be represented by $OTP(KS_1, KS_2, KS_3, t)$. For a given $OTP(K,t)$ received by OTP authenticator 20, for example from the user of laptop 40, OTP authenticator 20 uses secure computation protocol 80 to compute a corresponding $OTP(KS_1, KS_2, KS_3, t)$. If $OTP(K,t)$ is equal to $OTP(KS_1, KS_2, KS_3, t)$ OTP authenticator 20 determines that $OTP(K,t)$ is authentic, if on the other hand $OTP(K,t)$ and $OTP(KS_1, KS_2, KS_3, t)$ are not equal OTP authenticator 20 determines that $OTP(K,t)$ is not authentic.

Following its determination of whether or not $OTP(K,t)$ is authentic, OTP authenticator 20 transmits the determination to service 30. Service 30 in turn transmits a message to laptop 40 alerting the laptop user that $OTP(K,t)$ is determined to be authentic or not authentic as the case may be, and that he or she is respectively permitted or denied access to the service. Transmission of the determination by OTP authenticator 20 to service 30 is schematically indicated by a dashed arrow 105 and the message transmitted by service 30 to laptop 40 permitting or denying access is schematically indicated by dashed arrows 106 and 107. It is noted that service 30 and OTP authenticator 20 may communicate with each other using communication channels provided by any wired and/or wireless communication network.

Figure 2:
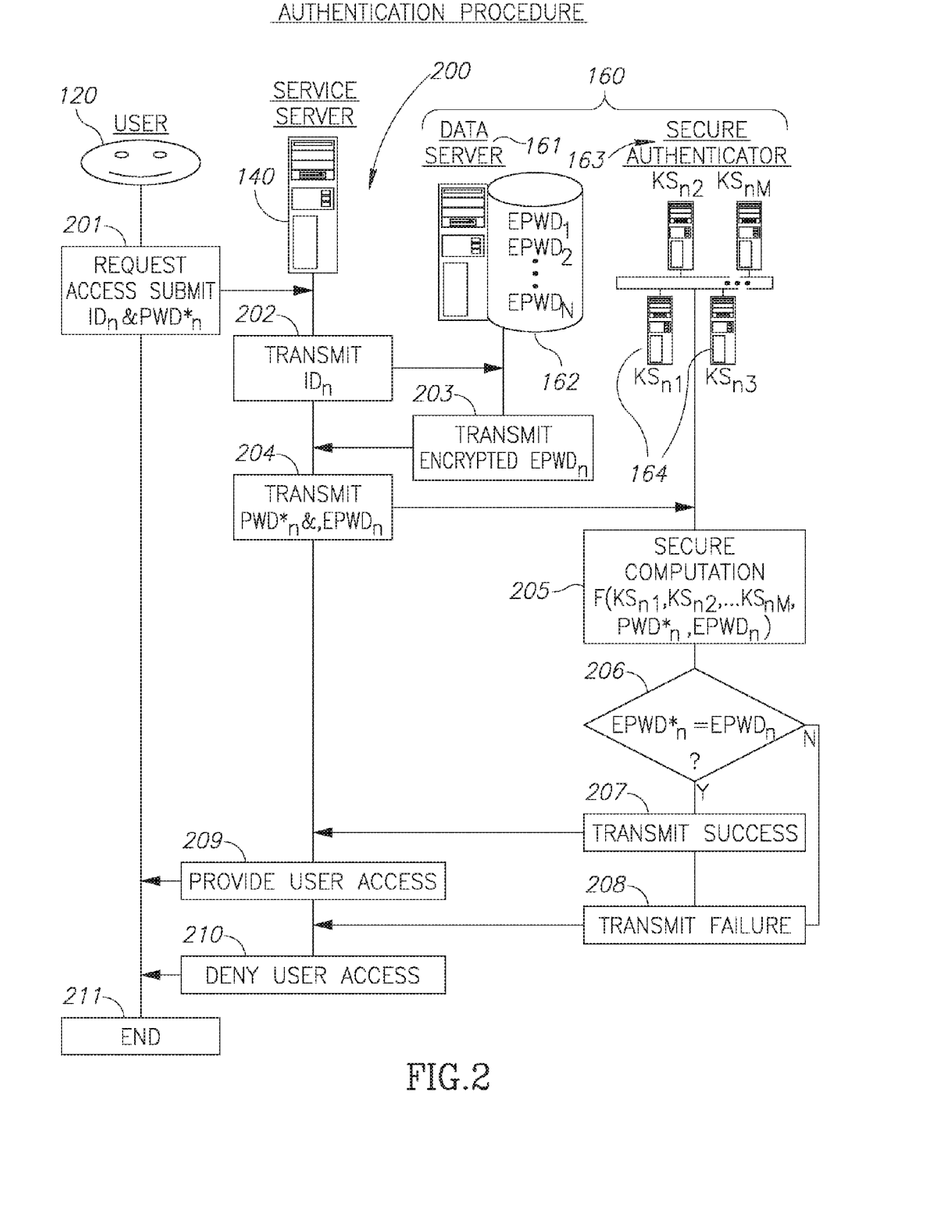
FIG. 2 schematically shows a secure authenticator authenticating a static password to authenticate a user identity using a secure computation protocol, in accordance with an embodiment of the invention.

Whereas the above discussion describes an authenticator in accordance with an embodiment of the invention operating to authenticate OTPs, practice of embodiments of the invention is not limited to authenticating OTPs. For example, FIG. 2 schematically shows an authenticator 160 in accordance with an embodiment of the invention that operates to authenticate static passwords that users use to gain access to a desired service provided by a service server 140. Service server 140 may, by way of example, be a bank server that provides bank services to users who are bank customers or an enterprise server that provides services to users who are employees of an enterprise. An n-th user of N users subscribed to services offered via service server 140 is identified by an identity $ID_n$ and submits a password $PWD_n$ associated with $ID_n$ to service server 140 to gain access to a desired service that may be provided by the service server.

Authenticator 160 optionally comprises a database server 161 and a plurality of M authentication servers 164. Data server 161 houses a database 162 having stored for each subscriber $ID_n$ an encryption $EPWD_n$ of the subscriber's password $PWD_n$. Encryption $EPWD_n$ is generated using an encryption key $K_n$ and a given encryption algorithm. The given encryption algorithm may be any of various suitable encryption algorithms and may by way of example, comprise one or any combination of two or more of a triple data encryption algorithm (3DES), an advance encryption standard (AES) algorithm, or hash based message authentication code (HMAC). Optionally, encryption keys $K_n$ subscripted with different subscripts "n" are different. In accordance with an embodiment of the invention, each encryption key $K_n$ is split into M shares $KS_{n,m}$, $1 \leq m \leq M$, with an m-th share stored in an m-th authentication server 164.

FIG. 2 schematically shows an n-th user 120 attempting to gain access to a service provided by service server 140 and being authenticated by authenticator 160 using an authentication procedure in accordance with an embodiment of the invention. The authentication procedure is optionally similar to an authentication procedure illustrated in a flow diagram 200 in the figure. Numeral 200 may be used to refer to the authentication procedure as well as the flow diagram illustrating the authentication procedure In a block 201 user 120 submits the user's identity $ID_n$ and a password $PWD^*_n$ to service server 140. In a block 202 service server 140 transmits $ID_n$ to data server 161. The data server retrieves from database 162 encrypted password $EPWD_n$ associated with $ID_n$, and in a block 203 optionally transmits encrypted password $EPWD_n$ to service server 140. Optionally, in a block 204 service server 140 transmits the user submitted password $PWD^*_n$ and encrypted password $EPWD_n$ to secure authenticator 163.

In a block 205 authentication servers 164 cooperate to perform an N-party secure computation to evaluate a "decision function" $F(KS_{n,1}, KS_{n,2}, \ldots KS_{n,M}, PWD^*_n, EPWD_n)$ that is a function of secret shares $KS_{n,1}, KS_{n,2}, \ldots KS_{n,M}$, password $PWD^*_n$ and encrypted password $EPWD_n$. A value for $F(KS_{n,1}, KS_{n,2}, \ldots KS_{n,M}, PWD^*_n, EPWD_n)$ that results from the M-party secure computation indicates whether or not an encryption, $EPWD^*_n$, of $PWD^*_n$ generated by the given encryption algorithm and encryption key $K_n$ is the same as $EPWD_n$ retrieved from database 162.

In a decision block 206 authenticator 160 determines if the value of $F(KS_{n,1}, KS_{n,2}, \ldots KS_{n,N}, PWD^*_n, EPWD_n)$ indicates whether $EPWD_n$ is or is not an encryption $PWD^*_n$. If the value indicates that $EPWD_n$ is an encryption of $PWD^*_n$ then optionally in a block 207 authenticator 160 transmits to service server 140 that authentication was successful and in a block 209 service server 140 provides user 120 with access to the desired service provided by the service server. If on the other hand the value of the decision function $F(KS_{n,1}, KS_{n,2}, \ldots KS_{n,N}, PWD^*_n, EPWD_n)$ indicates that $EPWD_n$ is not an encryption of $PWD^*_n$, in a block 208 authenticator 160 transmits to service server 140 that authentication failed, and in a block 210 the service server denies user 120 access to the service.

Figure 3:
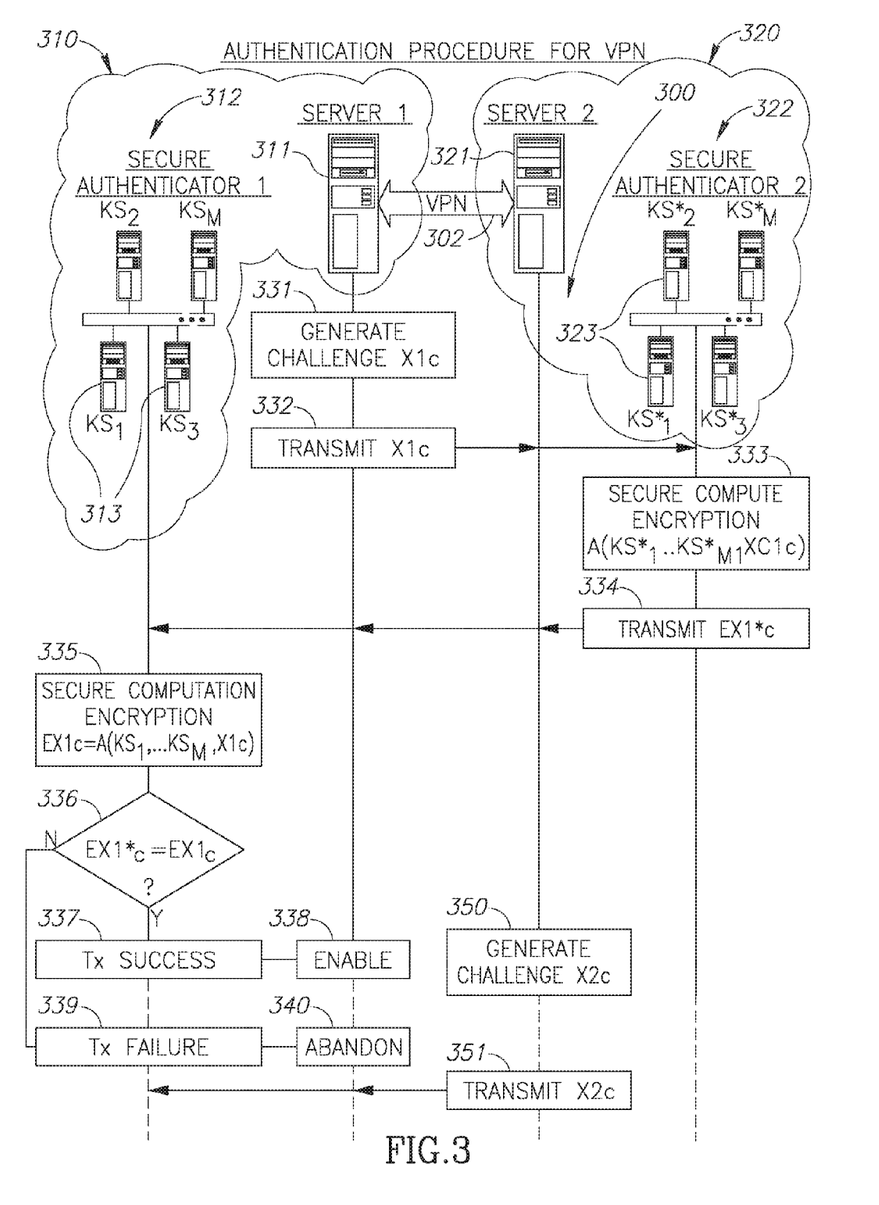
FIG. 3 schematically shows two networks establishing a VPN communication network using a secure computation protocol to authenticate at least one of the networks, in accordance with an embodiment of the invention.

FIG. 3 schematically shows another example of an embodiment of the invention in which first and second communication networks 310 and 320 respectively engage in a handshake in which at least one of the networks is authenticated by the other to establish a secure virtual private network channel (VPN) 302 over which they can communicate. Authentication is performed using secret shares of encryption keys in accordance with an authentication procedure similar to that shown in a flow diagram 300 in FIG. 3.

Communication network 310 comprises a server 311 that functions as a point of presence (POP) for communication with other networks and a secure authenticator 312 comprising M authentication servers 313 in which secret shares $KS_m$, $1 \leq m \leq M$ of an encryption key K are respectively stored. Communication network 320 comprises a server 321 that functions as a POP for communication and a secure authenticator 322 comprising M authentication servers 323 in which the secret shares $KS^*_m$ of an encryption key $K^*$ are respectively stored. In accordance with an embodiment of the invention communication networks 310 and 320 are configured to require that encryption keys K and K* be equal to enable VPN channel 302

In a block 331 server 311 generates a random string as a challenge, $X1c$, for authenticating communication network 320, and optionally in a block 332 transmits the challenge to server 321 in a "HELLO" message requesting establishment of VPN channel 302. The HELLO message optionally designates an encryption algorithm "A" for encrypting challenge $X1c$. Server 321 receives the challenge and forwards it to secure authenticator 322. Authentication servers 323 cooperate and exchange information to execute a secure computation of the designated algorithm A to generate an encryption EX1*c of X1c using secret shares $KS^*_1$, $KS^*_2$, ... $KS^*_M$. In a block 334 secure authenticator 322 transmits encryption EX1*c to server 321, which in response to the HELLO message from server 311 forwards encryption EX1*c in a return HELLO message to server 311. Server 311 transmits the received encryption EX1*c to secure authenticator 312.

Optionally in a block 335 authentication servers 313 cooperate and exchange information optionally to execute a secure computation of designated algorithm A to generate an encryption EX1c of X1c using secret shares $KS_1$, $KS_2$, ... $KS_M$. In a decision block 336 secure authenticator 312 determines whether EX1c is equal to EX1*c. If EX1c equals EX1*c, in a block 338 secure authenticator 312 optionally transmits to server 311 that authentication has succeeded, and in a block 338 the server enables VPN channel 302. On the other hand, if EX1c is determined not to be equal to EX1*c, in a block 339 secure authenticator 312 optionally transmits to server 311 that authentication has failed, and in a block 340 the server abandons establishing VPN channel 302.

In an embodiment of the invention, the handshake between servers 311 and 321 may require a two way authentication, and in addition to server 311 challenging server 321, server 321 may engage server 311 in an authentication procedure to authenticate server 311 to server 321. Optionally, server 321 challenges server 311 in an authentication procedure similar to the authentication procedure in which server 311 challenges server 321, and in a block 350 server 321 generates a challenge X2c, which in a block 351 sever 321 transmits to server 311. Subsequent steps in the challenge are similar to those described in blocks 333-340 and are not shown in FIG. 3.

It is noted that in the above description of establishing VPN channel 302 it was assumed that secure authenticators 312 and 322 in networks 310 and 320 have secret key shares K and K*. Many hand shaking procedures for setting up a VPN channel between two computers require that the computers agree on a message encryption protocol and "exchange" a secret key so that both computers have a same secret key for using the encryption protocol. Typical key exchange protocols are the IPSEC (Internet protocol security) and SSL (Secure Sockets Layer) protocols.

In an embodiment of the invention for which M secret shares of a same encryption key are to be provided respectively to M authentication servers, provision of the secret key for each of the M servers may be accomplished using for example asymmetric encryption or a Diffie-Hellman key exchange algorithm.

In an embodiment of the invention secure computation may be used to implement a Kerberos protocol in which a key distribution center (KDC) issues ticket granting tickets (TGTs) to users that enable the users to acquire service tickets (STs) for access to services provided by service servers. The TGTs are encrypted using long term secret keys (often passwords), which are stored in the KDC and are associated with the users and the services. The secret keys are used by the KDC and service servers to authenticate identities of users and issue TGTs to authorized users to access services provided by the service servers.

In an embodiment of the invention a KDC, hereinafter a secure KDC, is configured comprising a secure authenticator having a plurality of authentication servers. Long term keys used by the secure KDC are split into secret shares, and each secret share of a same long term key is stored in a different authentication server. The authentication servers cooperate using a secure computation protocol to authenticate a user and/or encrypt TGTs and/or authorize use of a service by the user responsive to their respective secret shares of a secret key associated with the user. In executing the secure computation protocol none of the authentication servers acquire the secret share of another of the servers and/or a copy of the secret key.

In an embodiment of the invention, a plurality of authentication servers is configured to operate as a virtual hardware security module (VHSM) that splits encryption keys into secret shares and stores different shares of a given encryption key as secret shares of the key in different servers of the plurality of servers. Optionally, the VHSM is configured to generate the encryption key. In an embodiment of the invention, the VHSM is configured to be accessed by an API (application programming interface) to encrypt and/or decrypt information and/or evaluate a function, for a computer program interfaced by the API by executing a secure computation protocol that uses the secret shares.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of authenticating a party for participation in an activity, the method comprising:
    dividing a first secret key into a plurality of secret key shares;
    storing each of the plurality of the first secret key shares in a different server of a plurality of servers so that none of the servers has access to the secret key share stored in another of the servers;
    transmitting a challenge to the party and requesting that the party encrypt the challenge using a second key;
    after the party encrypts the challenge using the second key, receiving the encrypted challenge from the party;
    executing at the plurality of servers a secure computation protocol to generate encryption of the challenge using the plurality of secret key shares without providing any of the plurality of servers with access to the first secret key and to the secret key share stored in another of the servers;
    comparing the encrypted challenge received from the party and the encrypted challenge generated by the plurality of servers to determine whether the second key is equal to the first key; and
    enabling the party to participate in the activity if and only if it was determined that the first and second keys are equal.

2. The method according to claim 1 wherein the activity comprises establishing a virtual private network communication channel.

3. The method according to claim 1 wherein the party comprises a communication device.

4. The method of securing data according to claim 1 wherein the first secret key comprises a key used in a Kerberos protocol and the challenge comprises an encryption of a ticket granting ticket (TGT) used by the secure computation protocol.

5. The method of securing data according to claim 1 wherein the first secret key comprises a key used in a Kerberos protocol and the challenge comprises an encryption of a service ticket (ST) used by the secure computation protocol.

6. The method of securing data according to claim 1 wherein the first secret key comprises a feature vector representing a biometric feature.

* * * * *